Feb. 27, 1951      L. C. RONEY      2,543,203
PRESSURE REGULATOR
Filed July 1, 1946
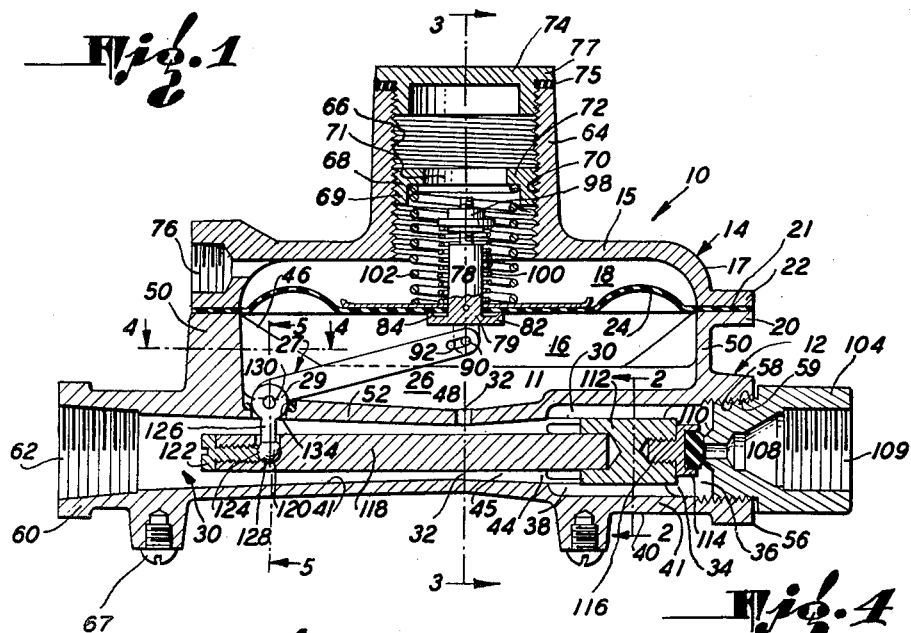
Fig.1
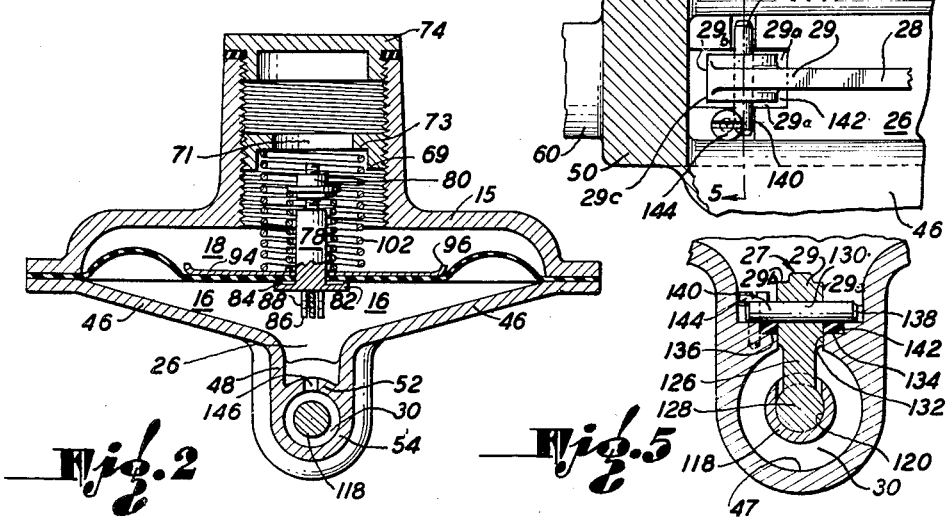
Fig.3    Fig.4
Fig.2    Fig.5
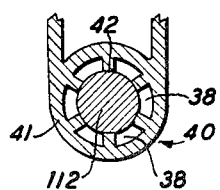
INVENTOR
LEONARD C. RONEY
BY
ATTORNEY Patented Feb. 27, 1951

2,543,203

UNITED STATES PATENT OFFICE 2,543,203

PRESSURE REGULATOR

Leonard C. Roney, Los Angeles, Calif.

Application July 1, 1946, Serial No. 680,653

1 Claim. (Cl. 50—26)

This invention relates to pressure regulating valves, and in particular relates to the improvement of that certain type of pressure regulator forming the subject of United States Letters Patent No. 2,302,175, issued to James H. Bowen, November 17, 1942, which have special utility in gas systems fed from metal storage containers, the quantity of stored gas in which is diminished in use with concurrent proportional decrease in gas pressure.

In gas systems of the type referred to in the foregoing, it has been found that when a new tank is connected to the system, an ample flow of gas will be obtained for the reason that the inlet pressure of the gas fed to the pressure regulator is sufficient to produce the required flow of gas through the inlet orifice of the valve and the space between the valve seat and the closure, but when the tank pressure becomes depleted to a low value, for example, around five or ten pounds per square inch, the control valve of the ordinary type many times will not open sufficiently to give the volumetric flow of gas necessary for suitable operation of burners fed by the gas system.

One achievement of the regulator described in the patent referred to is insurance of an ample flow of gas under conditions or relatively low pressures which result from removal of gas from the container, as well as the provision of adequate, but not excessive, flow when the fully charged container has just been connected to the gas consuming system.

A disadvantage of the regulator of the Bowen patent is its cost of manufacture, and it is one of the objects of this invention to provide a pressure regulator which has all of the advantages of the pressure regulator disclosed in the Bowen patent, but which, at the same time, is of such a construction that it is more economical to manufacture, assemble and to repair and replace parts.

Another object of my invention is to provide a pressure regulator in which machine work is reduced to a minimum without sacrificing any of the features and advantages of the pressure regulator described in the Bowen patent.

It is a further object of my invention to provide a pressure regulator of the type referred to in which the regulation provided by the pressure regulator is relatively unaffected over long periods of use.

It is an additional object of my invention to provide in a pressure regulator of the type referred to, a construction which is relatively rugged.

Other objects of my invention will appear in the following specification wherein reference is made to the accompanying drawings, in which:

Fig. 1 is a vertical sectional view in a plane including the axis of flow through a pressure regulator embodying my invention;

Fig. 2 is a fragmentary vertical section transverse the axis of flow at line 2—2 of Fig. 1;

Fig. 3 is a vertical section transverse the axis of flow at line 3—3 of Fig. 1;

Fig. 4 is an enlarged fragmentary section and plan view at and from line 4—4 of Fig. 1; and Fig. 5 is a fragmentary section in elevation at line 5—5 of Figs. 1 and 4.

In the drawings there is shown a pressure regulator 10 having a base 12 and a hood 14. The base 12 provides a gas pressure chamber concavity 16, and the hood 14 provides an atmospheric pressure chamber concavity 18.

The base 12 is provided with a flange 20 surrounding the concavity therein, and the hood 14 is provided with a flange 22 surrounding the cavity therein. The base 12 and the hood 14 are secured together with a diaphragm 24 therebetween, as shown, by means of suitable bolts (not shown) passing through flanges 20 and 22 and tightened to form a seal in a conventional manner. Concavities 16 and 18, therefore, form a diaphragm chamber. A portion of the concavity 16 has a trough 26 which receives therein a lever arm 28, actuated by the diaphragm 24 in a manner more particularly described hereinafter.

Beneath the trough 26 the body 12 provides therethrough, a passage generally characterized by the numeral 30. The body 12 is formed to provide in the passage 30 a gradual restriction thereof toward a central region thereof at 32. Thus, the cross-sectional area of the passage 30 increases in both directions from the region 32, the interior surfaces of the passage defining the increasing cross-sections being preferably conoidal and, therefore, of right circular section, as shown in Fig. 3. It will be understood by those familiar with such matters that when gas is forced through this passage the velocity is greatest in the region 32, and by a well known principle, known as Bernoulli's theorem, the pressure, of all points in the passage, is least at region 32.

The body 12 is further formed to provide at one end of the passage 30 flow regulating region 40, and a valve chamber 34. Valve chamber 34 is somewhat larger in diameter than, and is disposed at the outermost end 36 of the passage. The body 12, leftward of valve chamber 34, provides a plurality of flutes 38 formed in the section 41 of the body 12. The flutes 38 are formed, to extend longitudinally from the chamber 34, in an interiorly cylindrical wall surface 42 in the body section 41. The flutes terminate slightly rightward of the region 44 which also is the beginning of the reducing portion 45 of the conoidal interior passage defining the restriction at region 32 above referred to.

From the region 32 of passage 30 the conoidal portion of the passage expands leftward toward an outlet at 62, forming the portion 47 of tapered right circular sections. It will be evident that the body 12 can easily be cast or machined to form the tapered passage portions 45 and 47 and that the flutes 38, and the chamber 34, may also be easily formed by the casting and/or machining operations. The cylindrical surfaces 42 are the portions of the body member concerned with flow regulation which are machined.

The concavity 16 is defined by inclined wall sections 46, through lateral wall sections 48 and end wall sections 50, and a longitudinal web section 52, forming the floor of trough 26, and the greater part of the ceiling of the passage 30, all of which sections are portions of body 12. The balance of the passage 30 underlying the concavity 16 is formed by a tubular section 54 of body 12. Section 54 provides at the valve chamber end 36 thereof a projecting fitting receiver 56, which is internally threaded at 58 to receive a fitting 104 to be described. Tubular section 54 provides at the discharge end thereof a delivery fitting receiver projection 60, which is internally threaded as at 62 to receive the threaded end of a pipe or fitting (not shown) connected to gas utilization apparatus, also not shown.

Suitable mounting bosses 65 are formed on the bottom of the body 12 which are drilled and tapped to receive screws 67.

The hood member 14 includes a centrally disposed tubular portion 64 which is provided with an internal thread 66. The hood 14 further comprises the radially flat, or disc-like portion 15 having a belled portion 17 to form the concavity 18, which terminates in the radial flange 22 to form a flat diaphragm engaging surface 21 in a radial plane of the axis of tube portion 64.

A spring seating ring 68 is provided with external threading 70 and received by thread 66. Spring seating member 68 further provides a central access opening 71 for adjustment of a nut 98 to be described. Spring seating member 68 includes an interior annular flange 72 which provides a spring seat 73 disposed toward diaphragm 24. Spring seating member 68 further includes a cylindrical wall 69 surrounding seat 73 to form a spring centering portion of the seat.

A sealing closure cap 74 closes the passage otherwise formed by tubular portion 64 between concavity 18, and atmosphere hood 14 further provides threaded outlet 76 to which a suitable vent tube, not shown, is normally connected to atmosphere outside a building in order to provide atmospheric pressure in concavity 18 and to vent escaping gas at a safe distance, should the diaphragm 24 permit leakage.

To further effect a thorough seal of the hood cavity 18 against gas escape, a gasket 75 is clamped against the upper end of tube 64 by a flange 77 formed on cap 74. The diaphragm 24 has a central hole therein through which there is inserted a linkage fitting 78 having a cylindrical body portion 79 and a reduced threaded spring adjustment and seating nut receiving portion 80 extending through the concavity 18 and into the passage formed by tubular portion 64. The linkage fitting 78 is further provided with an annular flange 82 disposed in the concavity 16. The flange 82 is provided with a full circumferentially extensive axially disposed lip 84 abutting against the lower or pressure side of the diaphragm 24. The linkage fitting 78 is further provided with two trunnion forming extensions 86, one at each side of the central axis of body 79. Extensions 86 are disposed in concavity 16 and are provided with aligned bearing holes 88 therein. A linkage pin 90 is disposed through holes 88 and engages, through a slot 92 in a regulator lever arm 28. Thus, a required connection is formed between the fitting 78 and the regulator lever arm 28.

The diaphragm 24 has disposed thereagainst at the side opposite lip 84, a flat surfaced backing washer 94 provided with a central hole for passage therethrough of portions 79 and 80 of the linkage fitting. The washer 94 is also provided with a circumferentially fully extensive curled edge 96, rolled away from the diaphragm to protect the diaphragm in its flexure thereagainst.

A spring seating nut 98 provided with a spring centralizing seat as shown, is received on the threaded portion 80 of linkage fitting 78 and a coil spring 100 surrounds the portion 78 and bears against nut 98, and washer 94, to effect a gas-tight seal by the coaction of lip 84, compressing the diaphragm against the washer 94 as shown. By removing cap 74, access is had for adjustment of nut 98 and ring 68.

Upward motion of the diaphragm 24 under action of gas pressure increases in concavity 16 is opposed by a second coil spring 102, the ends of which are, respectively, seated against seating ring 68 and washer 94, as shown.

The valve and movable regulator components of the flow regulator will be described in the following. An inlet fitting 104 is provided having adapter threadings 59 and 109. The threading 59 thereof is engaged in threading 58 of projection 56, and the threading 109 is disposed for connection to a bottle (not shown) containing gas under high pressure. The inlet fitting 104 so mounted provides a flow restricting hole 108 communicating the valve chamber 34 with the gas bottle. Surrounding the hole 108, within the chamber 36, the inlet fitting 104 provides a valve seat 110. The movable portions of the valve and flow regulator will now be described.

The regulator has a piston 112 which slides in the previously described cylinder 42, formed by section 40 between flutes 38. A valve 114, mounted in the head of a screw 116 which is carried by piston 112, reciprocates therewith toward and away from seating engagement with valve seat 110, so as to close or open the hole 108 against gas passage.

The piston 112 has secured thereto a connecting rod 118 of uniform cross-section along its length, by which the piston is caused to reciprocate as will be pointed out. The length of piston 112 along its axis is, as shown in Fig. 1, less than the length of the flutes 38 so that the passageways or flutes 38 will always remain open.

The connecting rod 118 extends toward the opposite end of passage 30 from chamber 34, and is provided near the downstream end thereof, with a slide-entering drilled recess 120, and an end-entering drilled and tapped hole to receive a screw 122. Screw 122 has a cupped end 124 which extends into the recess 120.

A bell crank 27, which provides the lever arm 28, and provides a lever arm 126, is provided on the end of the arm with a ball 128. The ball 128 is operatively held in the intersection of drilled entries of connecting rod 118 by the screw 122.

The bell crank lever 27 is provided with a fulcrum elbow 29 providing a cylindrical hole 130 therethrough at right angles to the common plane of lever arms 28 and 126. The elbow 29 is provided with flat sides 29a at right transverse planes to the axis of hole 130. The elbow 29 provides a surface 29b externally right cylindric upon the axis of hole 130, at the outside of the knee formed by the bell cranks 28 and 126, and elbow 29 also provides a surface 29c externally cylindric upon the axis of hole 30 at the inside of the knee formed by the bell crank 27.

A rectangular hole 132 is formed through the web 52, of a size to receive the elbow 29, as shown in Figs. 1 and 5, opposite drill hole 120; and a shelf 134 is formed therearound to provide a seat 136 for a rectangular sealing gasket 142. The web 52 is further provided with recesses 138 wherein there is fastened a pivot pin 140, which passes through bearing hole 130 in the cylindrical elbow of the bell crank lever.

The rubber seal 142 is provided with a rectangular opening, through which the ball 128 and arm 126 are passed during assembly. The pin 140 is held in place by a headed screw 144 received in a tapped recess in the body 12, as shown.

A hole 142 is provided through web 52 at the restricted region 32, to communicate the lowest pressure region 132 in the tube with the concavity 16.

In manufacture the assembled connecting rod 118, piston 112, valve 114, and loosely held screw 122, are passed leftward through chamber end 36, the left end of rod 118 being positioned opposite opening 134. The fitting 104 may, of course, be fixed after the regulator assembly has been inserted in passage 30.

The fulcrum seal 142 is emplaced. The bell crank lever and linkage can now be installed with the fulcrum, and the screw 122 taken up against ball 128. The pin 140 is then fastened down. The diaphragm 24, with its washer 94, are next emplaced. The spring 100 and the nut 98 are then assembled. The spring 102 and assembled hood 14 may then be bolted to the base and diaphragm.

In describing the operation, it is to be understood that the closed position of valve 114, as shown, is representative of the position of the parts when, through closure of valves in utilization apparatus, not shown, practically no gas passes the outlet 62, and gas pressure is applying a thrust upward against the diaphragm 24, sufficient to close valve 114.

From the foregoing it will be seen that by properly machining the surface 42 of the body section 41, and the outer cylindrical surface of the piston 112, that the movable assembly comprising the piston 112 and the connecting rod 118, and parts supported thereby, are slidably supported in proper operating positions.

The leftward end of the connecting rod 118 may receive some support from the arm and ball 126 and 128 respectively, to take some of the disaligning pressure off of the inter-engaging machine surface 42 and the cylindrical surface of the piston 112. By forming the body 12 with the Venturi-shaped passage 30, and by forming the enlarged chamber with the flutes 38 for receiving the piston 112, not only is the efficient Venturi action achieved, but, as previously explained, machining is reduced to a minimum.

The operation of my invention is substantially the same as that in the Bowen patent previously referred to, except that by reason of the passage 30 being formed in an efficient venturi, by reason of placing the opening 32 at the diameter of smallest cross-section, the regulator of my invention is even more efficient than the regulator of the Bowen patent.

When no gas is being withdrawn from the piping in which the regulator is connected, the valve 114 is held against the valve seat 110. However, when gas is withdrawn from the system, the gas pressure in the left end of the passage 30 will be reduced, which will almost instantaneously result in a movement of the regulating member or assembly carrying the valve 114, and allow gas to start to flow through the passage 30. The gas flows through the flutes 38 around to the piston 112 and through the Venturi passage 30. Due to the Venturi shape of this passage, its velocity is greatest at the zone of the opening 32, and this causes an immediate and induced reduction in pressure in the concavity 16. This assures a full opening of the valve and a removal of the valve 114 from the seat 110 a sufficient distance to assure adequate space for the necessary flow of gas through the regulator and the piping connected thereto.

By reason of the lack of any restriction around the piston 112, and by reason of the efficient Venturi action, the regulator of my invention will insure an adequate supply of gas even though the pressure in the supply tank is relatively low.

I claim:

In gas flow apparatus: wall means defining a fluid flow passage having a Venturi-shaped portion, an enlarged portion adjacent one end of said passage and a valve seat at said end, said wall means having an opening therein at the throat of said Venturi-shaped portion and a second opening adjacent the end of the passage opposite the enlarged portion; a plurality of annularly spaced flutes extending radially inwardly of said enlarged portion of the passage and of less width than the radius of said enlarged portion; a valve member slidably received on the inner edges of said flutes for movement toward and away from said valve seat; an elongated element connected at one end to said valve member and extending through the Venturi shaped portion of the passage, said element being of less diameter than the throat of the Venturi shaped portion and being of uniform cross section; a movable wall responsive to variations in the differential of pressure on opposite sides thereof; means for connecting said movable wall with said element, said means including a portion extending through the second opening; sealing means for said second opening for sealing said opening against the passage of fluid therethrough; and means for subjecting said movable wall to a pressure derived through the first mentioned opening in the wall means.

LEONARD C. RONEY.

REFERENCES CITED

The following references are of record in the file of this patent:

UNITED STATES PATENTS

| Number | Name | Date |
| --- | --- | --- |
| 1,097,322 | Hodge | May 19, 1914 |
| 1,263,792 | Mueller | Apr. 23, 1918 |
| 1,540,439 | Thrall | June 2, 1925 |
| 2,302,175 | Bowen | Nov. 17, 1942 |
| 2,323,888 | Wright | July 13, 1943 |

FOREIGN PATENTS

| Number | Country | Date |
| --- | --- | --- |
| 42,222 | Netherlands | Dec. 15, 1937 |
| 367,284 | Great Britain | Feb. 18, 1932 |
| 370,907 | Great Britain | Apr. 12, 1932 |